3,065,052
PURIFICATION OF STRONTIUM NITRATE
Willard S. Bundy, North Massapequa, N.Y., and Albert Pavlik, Jr., Euclid, Ohio, assignors to Barium and Chemicals, Inc., Willoughby, Ohio
No Drawing. Filed Aug. 27, 1957, Ser. No. 680,633
13 Claims. (Cl. 23—102)

This invention relates to the purification of strontium nitrate, and especially to processing commercial strontium nitrate for removing barium and other impurities therefrom and to the provision of a novel purified type of strontium nitrate.

Strontium chemicals have long been employed in pyrotechnical compositions, such as for signal flares when and wherever a bright red flame is desired and in igniters and tracers for ammunition. Strontium nitrate in particular is effective in such compositions because of its ability to serve as an oxidant. However, impurities in the strontium nitrate may seriously alter the tint of the red flame; sodium, for example, causes the flame to be more orange or yellow colored, whereas barium impurities render the flame greenish. Additionally, impurities such as calcium nitrate or even very small amounts of chlorine, iron, lead, copper or sulfur and other materials cause the material to be hygroscopic and therefore difficult to blend homogeneously with the other ingredients of the pyrotechnical compositions. Additionally, the hygroscopicity may impair the ignition and/or stability of such materials, and cause the material to attack or effect the containers therefor.

High purity strontium nitrate is also desirable for preparation of other strontium chemicals such as strontium titanate where freedom from contamination of the alkali and alkaline earth elements is desired.

Because of the great chemical similarity between barium nitrate and strontium nitrate, the complete and efficient separation of the two requires considerable ingenuity. Unfortunately, barium is a common impurity in strontium chemicals. The commercial grades of strontium nitrate commonly available frequently contain, among other impurities, about 1.0% of barium as the nitrate salt. Small amounts of calcium nitrate present are rendered innocuous by the addition of an additive, such as an alkanoic acid, or a salt thereof, or a silicate, so that the material remains free-flowing. However, the removal of other materials in the strontium nitrate is also very important, as is the removal of barium, as such other impurities produce the undesirable hygroscopicity and generally poor shelf life of impure strontium nitrate.

The desirability of purifying the strontium nitrate has been previously recognized but no process has been provided heretofore for achieving such goal.

The general object of the present invention is to provide a new and improved process for effectively and inexpensively removing substantially completely, impurities such as barium, calcium, sodium, bismuth, magnesium, ammonium compounds, iron, lead, copper, sulfur, alkanoic acids and salts thereof, and silicates from strontium nitrate.

Another object of the invention is to remove alkanoic acids or salts thereof, or silicates by dissolving the commercial grade of strontium nitrate in water; and, after rendering the solution strongly alkaline with a solution of strontium hydroxide, filtering whereby the aforenamed impurities and hydroxides of the heavy metals present are removed from the solution and retained on the filter.

Another object of the invention is to provide a new product i.e. purified strontium nitrate that achieves the goal and new use of long storage life without impairing the functioning of the ammunition in which it is used.

Another object of the invention is to remove barium, substantially completely, from strontium nitrate as insoluble barium chromate by the gradual controlled generation of chromate ion in the solution containing the commercial grade strontium nitrate.

Another object of the invention is to remove any and all impurities substantially completely from commercial grade strontium nitrate under conditions such that no substantial amounts of other impurities are introduced.

The foregoing and other objects and advantages of the invention will be made more apparent as the specification proceeds.

The invention, generally speaking, relates to a process for the purification of strontium nitrate containing barium impurities and comprising the steps of preparing a water solution of the impure strontium nitrate, at least neutralizing the solution with nitric acid, mixing a chromic acid solution with the strontium nitrate solution to make the resultant solution strongly acid, agitating the strontium nitrate and acid solution and slowly adding a strontium hydroxide solution thereto until the pH reaches about 11 and remains constant at such pH for several minutes to precipitate barium impurities as barium chromate, filtering the solution to remove the barium chromate, boiling the filtrate, adding nitric acid to the filtrate as it boils to bring the material to a pH of about 1, evaporating the filtrate until the strontium nitrate starts to crystallize out, and recovering the purified strontium nitrate crystals.

The present invention relates to the purification of a solution of commercial strontium nitrate made by any commercial process. Alkanoic acids or silicates as well as the bulk of the calcium are removed by filtering the solution after being rendered strongly alkaline, for example, with strontium hydroxide. Strontium hydroxide preferably is used as the alkalizing agent since it does not introduce any other impurity into the solution, but other hydroxides can be used, such as sodium or potassium hydroxide, etc. The sodium or potassium then would be removed as set forth hereinafter. Strontium salts of the alkanoic acids, as well as strontium silicate and magnesium hydroxide, calcium hydroxide and hydroxides of the heavy metals, such as bismuth, lead, iron or copper hydroxide, which form under these conditions, being insoluble are removed by filtration. The alkaline filtrate after neutralization with nitric acid is treated with chromic acid, $H_2CrO_4$, in about 20% excess over the quantity required by the barium present in the solution to make the solution strongly acid, at least less than pH 4. The chromium is presumably present in the solution in hexavalent form essentially as the ions $Cr_2O_7^{-2}$ and $HCrO_4^{-}$ and as such does not precipitate barium. Thereafter, the addition of strong alkali, such as strontium hydroxide, converts these ions to the normal chromate ion:

$$Cr_2O_7^{-2} + 2OH^- \rightarrow 2CrO_4^{-2} + H_2O$$

$$HCrO_4^{-1} + OH^- \rightarrow CrO_4^{-2} + H_2O$$

which brings about the precipitation of barium as insoluble barium chromate, $$CrO_4^{-2} + Ba^2 \longrightarrow \underset{\text{Precipitate}}{BaCrO_4}$$

Barium chromate is more insoluble than strontium chromate and precipitates before the strontium compound. The slow gradual generation of the normal chromate ion, $CrO_4^{-2}$, by the gradual controlled addition of strontium hydroxide minimizes the coprecipitation of substantial amounts of strontium chromate which if allowed to occur, is not only wasteful of strontium but diminishes the amount of chromate available to precipitate the barium, in which case, as has been the practice in the prior art, all the barium may not precipitate. Thus strontium hydroxide is added gradually and usually by small increments over a period of about one hour to the strontium nitrate-chromic acid batch, which is vigorously agitated, until a permanent alkalinity of about pH=11 is attained. The precipitated barium chromate is removed by filtration. Barium chromate thus removed, after washing with water, contains less than one percent strontium chromate and is useful as a pigment and for other purposes. Small amounts of strontium chromate are present in the barium chromate because only a modest excess of chromic acid is used in the process. If additional chromic acid is used in the process, then higher percentages of strontium chromate will be obtained.

Any sulphide sulfur impurity present is oxidized by the chromic acid treatment and forms barium and/or strontium sulphate which is filtered off with the barium chromate. Should excessive amounts of sulfides be present, they should be removed prior to the chromic acid treatment if pure barium chromate is to be obtained.

Strontium hydroxide preferably is used in this alkalization, as before, since it does not introduce extraneous impurities. Also, any barium that the strontium hydroxide might contain is removed simultaneously with the barium contained in the strontium nitrate solution. If desired, other soluble strong hydroxides may be used for the alkalization.

During the addition of strontium hydroxide, the pH first increases rapidly; but at about a pH of 4, $BaCrO_4$ starts to precipitate, and the pH then increases only very gradually as further quantities of strontium hydroxide are added. When the $BaCrO_4$ is completely precipitated, the pH again increases rapidly with further additions of increments of strontium hydroxide.

In place of the chromic acid, soluble chromic acid salts such as ammonium chromate, sodium or potassium chromate or bichomate, etc. may be used to provide the chromate ions for use in the process of the invention. Strontium chromate also may be used in place of chromic acid to form the barium chromate precipitate. Nitric acid would be used to bring the processed liquor or solution down to a pH of about 1 prior to adding the chromium containing solution to the strontium nitrate solution.

In the method of this invention, the reaction system is self-buffering and the precipitation of the barium chromate occurs with only slight change of pH as strontium hydroxide is gradually added.

The precipitation of the barium chromate is not instantaneous. If the strontium hydroxide is added at too rapid a pace, the pH will mount inordinately because of the delay of the barium chromate in precipitating. If, before all the barium has precipitated, the addition of strontium hydroxide is stopped, the pH will drop as the barium chromate slowly precipitates. When alkalinity remains constant at about pH=11 for several minutes, the reaction is done. Normally, the addition of strontium hydroxide requires about 45 minutes to one hour with vigorous agitation of the reaction liquors, for batches of the size referred to hereinafter.

After the precipitated barium chromate is removed by filtration, the clear filtrate, which is yellow colored due to excess chromate, is acidified to a pH of about 1 by the addition of nitric acid and evaporated to form a heavy sludge of crystals of purified strontium nitrate. These crystals are separated from the mother liquor by suitable filtration action. The damp crystals are then washed with a pure water to yield white crystals of purified strontium nitrate. Such washing removes some of any small amounts of soluble sodium and calcium salts now present in the strontium nitrate. This filtration also removes heavy metal impurities such as chromium, nickel, and mercury, and sodium, potassium, calcium and ammonium, which don't form hydrous oxides and remain in solution in the acid mother liquor.

In order to secure pure white crystals, the evaporation of the acid strontium nitrate solution must be performed by pH of about 1, otherwise yellow strontium chromate would coprecipitate with the strontium nitrate as the evaporation proceeds. At pH=1 the amount of the normal chromate ion, $CrO_4^{-2}$, present in solution never exceeds the limits imposed by the solubility product of strontium chromate. The crystals as obtained directly from the mother liquor are usually yellowish-orange colored due to adhering film of mother liquor which is readily removed by a rapid flush of clean pure water. Some strontium nitrate is dissolved in the wash liquor but is substantially recovered in the subsequent second evaporation and other processing.

The final filtering operation is performed at about 35° to 50° C. to avoid the formation of the tetrahydrate of strontium nitrate which retains chromium as inclusions in the crystals.

For best results, a further purification action is desired. Thus damp unwashed crystals of the purified strontium nitrate may be dissolved in sufficient water at about 50° C. to form an approximately 50% solution. The resulting solution is rendered alkaline to about pH=11 by the addition of sufficient strontium hydroxide and then filtered. Metal impurities including residual chromate, in the processed liquor are further eliminated or reduced by this step as they precipitate as strontium chromate, or as the oxides or hydroxides of iron, bismuth, aluminum and magnesium and are removed by the filtration action. The filtrate is made slightly acid with nitric acid and evaporated to a heavy sludge. Pure white crystals are obtained after the supernatant liquor is removed, for example, by filtration. As in the prior filtration of the acid strontium nitrate solution, some metal impurities will be removed by this filtration. Crystals of purified strontium nitrate obtained in this manner are generally of larger size than those obtained in the previous crystallization. The bulk of the residual chromium present in the strontium nitrate crystals obtained in the first crystallization, as above indicated, is filtered off as strontium chromate during the alkaline filtration. Any chromium not so removed remains in solution during the subsequent evaporation and filtration so that a purified strontium nitrate end product is secured.

One specific example of the process of the invention is as follows:

5,000 lbs. of technical grade strontium nitrate containing about 0.5% Ba were dissolved in 700 gallons of water at, at least, 35° C. to produce a cloudy solution of about 46% concentration. Strontium hydroxide solution is then stirred into the solution until the pH is greater than 11. Usually not more than 4 pounds of $Sr(OH)_2.8H_2O$ are required. The turbid solution is then circulated through a suitable filter device until a clear discharge is obtained; a filter aid of the diatomaceous earth variety has proven beneficial in this operation.

The clear filtrate is then diverted to a second tank where it is then neutralized to pH=7 with about 67% nitric acid; normally less than 10 pounds of nitric acid is sufficient.

Twenty-one pounds of chromic acid anhydride, $CrO_3$, are then dissolved in 10 gallons of water at about 50° C. and added to the clear neutralized strontium nitrate solution with stirring.

Fifty pounds of strontium hydroxide hydrate, $$Sr(OH)_2.8H_2O$$

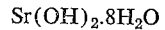

are dissolved in about 30 gallons of water in a separate tank, heated to, and maintained at a boil by a gentle stream of live steam bubbling into the solution.

This heated strontium hydroxide solution is then added in a small trickle, or by small increments, with agitation, over about a 45 minute to 60 minute period to the strontium nitrate solution. Preferably, the agitation is such that the liquor circulates in a vertical plane as well as in a horizontal plane. The hot strontium hydroxide solution is slowly added until a pH of about 11 is obtained. Further increments of strontium hydroxide may be necessary before the pH remains constant at 11 for several minutes. During this addition the temperature of the reaction liquor is maintained between 35°–50° C., and barium chromate precipitates from the liquor.

The reaction liquor containing the precipitated barium chromate is then circulated through a filter press, or equivalent apparatus, until a clear filtrate discharge is obtained. No filter aid is used here because it would detract from the value of the reclaimed barium chromate.

The clear filtrate is diverted to stainless steel tanks, or other non-reacting containers, and the filter cake is washed with water in an amount equal to 2–5 volumes of the volume capacity of the filter press, in this instance, approximately 100 gallons were used. The wash liquor is added to the main mother liquor.

It is desirable to use a filter press of large capacity capable of accommodating the barium chromate from several batchs so that the press need not be emptied after each run. When it is desired to recover the barium chromate, the filter cake is washed with hot water until the wash liquor no longer gives a precipitate with sodium carbonate solution. The press is then opened and the filter cake of barium chromate removed and dried. After grinding, it is suitable for pigment purposes.

Residual mother liquor from the second crystallization of purified strontium nitrate of a preceeding bath, as herein described, is also added to the present filtrate liquor in the stainless steel tanks for recycle through the final crystallization step of the invention.

The filtrate liquor place in the stainless steel tanks is maintained at a boil and concentrated nitric acid is promptly added until the pH=about 1. No agitation is required since the boiling action provides sufficient mixing. The liquor is evaporated until a very noticeable sludge of crystals are formed.

The batch sludge of strontium nitrate crystals is allowed to cool to about 50° C. but not less than 35° C. and then is transferred to suitable filtration apparatus, for example, such as a stainless steel vacuum filter box, where the supernatant liquor is removed by filtration.

Crystals of purified strontium nitrate can be otherwise obtained from the acid strontium nitrate solution. Thus, crystals of strontium nitrate can be obtained by cooling this acid solution which need not be boiled prior to or after acidifying. However, most desirable results are secured by concentrating this strontium nitrate solution at the acid pH of about 1 as referred to hereinabove.

When the filtration is completed, the filtrate is again evaporated under acid conditions and filtered as before to obtain a second crop of strontium nitrate crystals which are recycle along with a fresh charge of the technical grade strontium nitrate, and the resulting residual liquors are withdrawn from the process.

The crystals on the filter are generally almost pure white, retaining only a light buff color due to residual chromate. The weight of the damp crystals obtained here is generally about 4500 lbs. depending upon the extent of evaporation in the acid precipitation step and the amount of residual mother liquor introduced from the second crystallization of the strontium nitrate, as hereinafter described.

Although the crystals may be freed of color due to chromic acid by washing with pure water on the filter, best results are obtained by a second crystallization.

In a stainless steel steam jacketed, or other non-reactive tank, with agitator, the damp strontium nitrate crystals are redissolved in water at 40°–60° C. to a specific gravity of about 1.42 to 1.51 to form a 40 to 50% solution. The resulting soluton is rendered strongly alkaline by the addition of solid strontium hydroxide

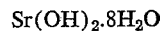

$$Sr(OH)_2 \cdot 8H_2O$$

Filter aid, such as one of the diatomaceous earth variety, is added and the solution circulated through a filter press until a clear filtrate is obtained whereupon it is diverted to a jacketed stainless steel tank. The filter press removes the bulk of residual chromium as strontium chromate.

The filtrate is then brought to a boil and adjusted to a pH of about 4 to 5 by the addition of concentrated nitric acid. The liquor is evaporated and the strontium nitrate crystals are filtered in the same manner as used to obtain the first yield of crystals.

After the supernatant mother liquor has been sucked off as thoroughly as possible on a filter, the strontium nitrate crystals are washed with a total of about 20 to 40 gallons of pure ion-free water in 2 or 3 portions to wash off the mother liquors. Any small amounts of sodium and calcium salts, present as soluble impurities, are also thereby removed.

Crystals so obtained are somewhat larger than the crystals obtained from the first crystallization and generally possess not more than a very faint suggestion of a greenish tint. The damp crystals are, for example, loaded into stainless steel pans and dried at about 125° C. until dry.

About 4,000 lbs. of product are so obtained.

The residual mother liquor from the process is added to the process liquor in a subsequent batch and then evaporated or otherwise processed for obtaining the strontium nitrate therefrom.

It should be noted that in practicing the process of the invention, non-reactive types of containers are used so that no impurities are placed into the processed material by such containers. Also, chemicals are used, by choice, so that only a minimum of foreign materials and impurities are introduced by such other chemicals used. Preferably distilled water is used when any water is added to the solution being processed to avoid the addition of calcium, magnesium or iron to the processed batch.

Typical and average analyses of commercial strontium nitrate and the purified strontium nitrate of the invention are as follows:

|  | Commercial Strontium Nitrate | | Purified Strontium Nitrate | |
| --- | --- | --- | --- | --- |
|  | Limits | Average | Limits | Average |
| Strontium Nitrate | Min. 96.7 | 98.2 | Min. 99.5 | 99.85 |
| Barium as Barium Nitrate | Max. 2.5 | 1.08 | Max. 2.00 | .05 |
| Calcium as Calcium Nitrate | Max. .50 | .34 | Max. .16 | None |
| Sodium as Sodium Nitrate | Max. .35 | .01 | Max. .04 | .004 |
| Chlorides as Chlorine | Max. .05 | .026 | Max. .002 | .001 |
| Water Insolubles | Max. .19 | .15 | Max. .03 (No Grit) | .008 |
| Moisture | Max. .50 | .05 | Max. .05 | .02 |

NOTE.—Minor impurities not covered in this analysis:

|  | Limits | Average |
| --- | --- | --- |
| Hygroscopicity | Max. 0.1 | .02 |
| Ammonium Compounds | None | None |
| Magnesium | Max. .005 | .0005 |
| Iron | Max. .003 | .0001 |
| Bismuth | Max. .003 | None |
| Lead | Max. .003 | None |
| Copper | Max. .003 | None |
| Sulfur (as sulfides) | None | None |
| Acidity | 6.0 to 7.0 | 6.5 |

In the analysis above, hydroscopicity is measured for 18 hours at 75% R.H.

It is also possible to practice the present invention by use of commercial grades of strontium carbonate as the starting material. A slurry of the strontium carbonate is acidified with excess nitric acid until a pH of about 1 is obtained. Such acidification converts the carbonate to strontium nitrate, water and carbon dioxide. Then the acid batch is treated with chromic acid as before and the batch is processed as set forth hereinabove.

Strontium hydrate also may be used as a starting material in the present process. It would be processed with nitric acid, like the strontium carbonate, to obtain strontium nitrate, have the chromic acid mixed therewith, etc. as in the process outlined hereinbefore. The invention can use other strontium compounds as starting materials if they can be reacted with nitric acid or nitric acid salts to provide strontium nitrate.

The process of the invention can be practiced with any of several starting substances and with very little change in the processing action thereon. A novel, pure end product is obtained and it is believed that the objects of the invention are achieved.

Strontium nitrate obtained by practice of the invention consistently contained less than .05% barium and generally contains less than .02% barium.

A very satisfactory end product can be obtained even though the initial alkalization and filtration steps are omitted.

By practice of the process of the invention, a novel, purified strontium nitrate is obtained and it has desirable properties for many uses for which previous impure strontium nitrate is not suitable.

This is a continuation-in-part of Willard S. Bundy application Serial No. 539,285, filed October 7, 1955, now abandoned.

While a certain representative embodiment and details have been shown for the purpose of illustrating the invention, it will be apparent to those skilled in this art that various changes and modifications may be made therein without departing from the spirit or scope of the invention.

What we claim is:

1. A process for the purification of strontium nitrate containing barium impurities comprising providing a strontium nitrate solution, mixing chromic acid solution with the strontium nitrate solution, agitating the acid solution and slowly adding small amounts of a strontium hydroxide solution thereto until the pH reaches about 11 and remains constant at such pH for several minutes to precipitate barium impurities as barium chromate, removing the barium chromate, and processing the remaining filtrate material with nitric acid and heat to obtain strontium nitrate crystals therefrom, sufficient nitric acid being added to render the filtrate strongly acid.

2. A process for the purification of strontium nitrate containing barium along with other impurities comprising dissolving the impure strontium nitrate in water, making the solution strongly alkaline with strontium hydroxide hydrate and filtering off insoluble matter, making the filtrate acid with nitric acid, preparing a solution of chromic acid, mixing the chromic acid solution with the strontium nitrate solution while agitating such solution, agitating the strontium nitrate-chromic acid solution vigorously and adding a strontium hydroxide solution thereto slowly until the pH reaches 11 and remains constant at such pH for at least 15 minutes to precipitate barium impurities as barium chromate, filtering the solution continuously until a clear filtrate is obtained to remove the barium chromate, boiling the filtrate, immediately adding nitric acid to the filtrate as it starts to boil to bring the material to a pH of 1, evaporating the filtrate until the bulk of the strontium nitrate has crystallized out, washing the strontium nitrate crystals with pure water, and recovering the purified strontium nitrate crystals.

3. A process as in claim 2 wherein the purified strontium nitrate crystals are redissolved in water, strontium hydroxide is added to the solution to precipitate any chromate present as strontium chromate, the strontium chromate is removed, the solution is acidified, and the solution is evaporated to secure the strontium nitrate.

4. A process for the purification of technical grade strontium nitrate containing barium impurities comprising dissolving about 5,000 pounds of the impure strontium in about 700 gal. of water, making the solution strongly alkaline with about 4 pounds of strontium hydroxide hydrate, filtering off any precipitate obtained, neutralizing the resultant solution with nitric acid, mixing chromic acid solution with the neutralized strontium nitrate solution, agitating the acid solution, adding about 50 pounds of strontium hydroxide in a heated water solution slowly to said acid solution until the pH reaches 11 and remains constant at such pH for several minutes to precipitate barium impurities as barium chromate, filtering the solution until a clear filtrate is obtained to remove the barium chromate, boiling the filtrate, adding nitric acid to the filtrate as it starts to boil to bring the material to a pH of about 1, evaporating the acid filtrate until the strontium nitrate crystallizes out, cooling the acid filtrate to between about 35° to 50° C., and recovering the purified strontium nitrate crystals from the cooled solution.

5. A process for the purification of strontium nitrate containing barium impurities comprising dissolving the impure strontium nitrate in water, making the solution strongly alkaline, filtering off any precipitate obtained, at least neutralizing the filtrate with nitric acid, mixing a chromic acid solution with the strontium nitrate acid solution to give the resultant solution a pH of less than 4, agitating the acid solution, slowly adding strontium hydroxide solution to the acid solution over a period of about one hour until the pH of the solution reaches about 11 and remains constant at such pH for about several minutes to preferentially precipitate barium impurities in the original acid solution as barium chromate, removing the barium chromate, boiling the filtrate, adding nitric acid to the boiling filtrate to give it a pH of about 1, boiling the strongly acid solution to form strontium nitrate crystals as a precipitate, cooling the strontium nitrate crystals-acid solution to between about 35° to 50° C. and filtering off the purified strontium nitrate crystals.

6. A process for the purification of strontium nitrate containing barium impurities comprising dissolving the impure strontium nitrate in water, at least neutralizing the solution with nitric acid, mixing a chromic acid solution with the strontium nitrate-acid solution to make the resultant solution strongly acid, agitating the strontium nitrate and acid solution and slowly adding a heated strontium hydroxide solution thereto until the pH reaches about 11 and remains constant at such pH for several minutes to precipitate barium impurities as barium chromate, filtering the solution to remove the barium chromate, boiling the filtrate, adding nitric acid to the filtrate as it boils to bring the material to a pH of about 1, evaporating the filtrate until the strontium nitrate starts to crystallize out, and recovering the purified strontium nitrate crystals.

7. A process for the purification of strontium nitrate containing barium impurities comprising dissolving the impure strontium nitrate in water, making the solution strongly alkaline with strontium hydroxide, filtering off any precipitate obtained, at least neutralizing the filtrate with nitric acid, mixing a chromic acid solution with the strontium nitrate acid solution to give the resultant solution a pH of less than 4, agitating the acid solution, slowly adding strontium hydroxide solution to the said acid solution until the pH of the solution reaches about 11 and remains constant at such pH for about several minutes, barium impurities being precipitated as barium chromate during such addition, removing the barium chromate, boiling the remaining solution, adding nitric acid to the boiling filtrate, and processing the acid filtrate to obtain strontium nitrate crystals therefrom.

8. A process for the purification of strontium nitrate containing barium impurities comprising providing a water solution of the impure strontium nitrate, acidifying the solution with nitric acid, mixing a hexavalent chromium containing solution with the strontium nitrate solution to make the resultant solution strongly acid, agitating the strontium nitrate and acid solution and slowly adding a heated strontium hydroxide solution thereto until the pH reaches about 11 and remains constant at such pH for several minutes to precipitate barium impurities as barium chromate, filtering the solution to remove the barium chromate, boiling the filtrate and adding nitric acid to the filtrate as it boils to bring the material to a pH of about 1, evaporating the filtrate until the strontium nitrate starts to crystallize out, and recovering the purified strontium nitrate crystals from the filtrate which has heavy metal impurities left therein.

9. A process as in claim 1 wherein the starting material is selected from the group consisting of strontium nitrate, strontium hydrate, and strontium carbonate, and the starting material is treated with a material from the group consisting of nitric acid salts and nitric acid to provide an acid strontium nitrate solution for processing action thereon.

10. A process as in claim 6 wherein the acid filtrate obtained when the strontium nitrate crystals are removed is further evaporated to obtain additional precipitate, which precipitate is removed and recycled with impure strontium nitrate for purification thereof, and the residual liquor from such second crystallization is withdrawn from the process.

11. In a process for the purification of a water solution of strontium nitrate, the steps comprising dissolving about 5,000 pounds of strontium nitrate containing about .5% barium as an impurity in water, mixing a chromic acid solution with the strontium nitrate solution, agitating the acid solution and gradually adding about 50 pounds of strontium hydroxide hydrate in solution thereto over a period of about one hour until the pH reaches about 11 and remains constant at such pH for several minutes to precipitate any barium impurities as barium chromate, and removing and recovering the barium chromate.

12. In a process for the treatment and purification of strontium nitrate containing barium impurities comprising providing a water solution of impure strontium nitrate, neutralizing the solution with nitric acid, mixing a chromic acid solution with the strontium nitrate solution to make the resultant solution acid of a pH of less than 4, agitating the strontium nitrate and acid solution and slowly adding a heated strontium hydroxide solution thereto until the pH reaches about 11 and remains constant at such pH for several minutes to precipitate barium impurities as barium chromate, filtering the solution to remove the barium chromate, and washing the barium chromate to provide a pure barium chromate end product.

13. A process for the purification of technical grade strontium nitrate containing barium impurities comprising providing a strontium nitrate solution, mixing a solution from the group consisting of chromic acid and strontium chromate with the strontium nitrate solution, agitating the acid solution and slowly adding small amounts of a strontium hydroxide solution thereto until the pH reaches about 11 and remains constant at such pH for several minutes to precipitate barium impurities as barium chromate, removing the barium chromate, and processing the remaining filtrate material with nitric acid and heat to obtain strontium nitrate crystals therefrom, sufficient nitric acid being added to render the filtrate strongly acid.

References Cited in the file of this patent

Recommended Specifications for Reagent Chemicals, Analytical Chemistry, vol. 25, No. 2, February 1953, page 369.